(12) United States Patent
Herndon et al.

(10) Patent No.: US 7,133,250 B2
(45) Date of Patent: Nov. 7, 2006

(54) INBOARD THRUST SURFACE FLUID RECIRCULATION PUMP

(75) Inventors: Troy M. Herndon, San Jose, CA (US); Christopher M. Woldemar, Santa Cruz, CA (US); Norbert S. Parsoneault, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 241 days.

(21) Appl. No.: 10/719,323

(22) Filed: Nov. 20, 2003

(65) Prior Publication Data

US 2004/0212921 A1 Oct. 28, 2004

Related U.S. Application Data

(60) Provisional application No. 60/464,772, filed on Apr. 22, 2003.

(51) Int. Cl.
*G11B 17/02* (2006.01)
*F16C 32/06* (2006.01)

(52) U.S. Cl. ............... 360/99.08; 310/90; 384/107; 384/110

(58) Field of Classification Search ............... None
See application file for complete search history.

(56) References Cited

U.S. PATENT DOCUMENTS

| | | | | |
|---|---|---|---|---|
| 5,524,986 | A * | 6/1996 | Leuthold et al. ............ | 384/119 |
| 5,791,785 | A * | 8/1998 | Nose et al. .................. | 384/119 |
| 5,806,987 | A * | 9/1998 | Nose et al. .................. | 384/100 |
| 5,839,833 | A * | 11/1998 | Zang .......................... | 384/107 |
| 6,126,320 | A * | 10/2000 | Ichiyama .................... | 384/112 |
| 6,154,339 | A * | 11/2000 | Grantz et al. ............ | 360/99.08 |
| 6,246,136 | B1 * | 6/2001 | Ichiyama .................... | 310/90 |
| 6,702,408 | B1 * | 3/2004 | Nagarathnam et al. ..... | 384/112 |
| 6,900,567 | B1 * | 5/2005 | Aiello et al. ................ | 310/90 |
| 6,914,358 | B1 * | 7/2005 | Tokunaga et al. ............ | 310/90 |
| 6,991,376 | B1 * | 1/2006 | Aiello et al. ................ | 384/107 |
| 7,042,125 | B1 * | 5/2006 | LeBlanc et al. ............. | 310/90 |
| 7,056,024 | B1 * | 6/2006 | Weingord et al. ........... | 384/100 |
| 2004/0184688 | A1 * | 9/2004 | Le et al. .................... | 384/107 |
| 2004/0218841 | A1 * | 11/2004 | Aiello et al. ................ | 384/107 |
| 2005/0015791 | A1 * | 1/2005 | Herndon et al. ............ | 720/695 |

* cited by examiner

*Primary Examiner*—Jefferson Evans
(74) *Attorney, Agent, or Firm*—Wax Law Group (57) ABSTRACT

An inboard thrust surface is provided for a spindle motor that maintains fluid flow through a journal bearing and generates an added offset pressure to avoid any subambient pressure within a journal. In an aspect, journal bearing asymmetry is minimized or eliminated and axial span is increased between journal bearings, reducing wobble or run-out between relatively rotating components. In another aspect, journal axial length is decreased for low profile disc drive memory systems and other spindle motors. In an aspect, two separate thrust surfaces provide an axial force in the same direction, opposing an axial bias force created by interaction of a stator and a magnet, and minimizing power consumption.

20 Claims, 6 Drawing Sheets

FIG. 6

INBOARD THRUST SURFACE FLUID RECIRCULATION PUMP

CROSS REFERENCE TO RELATED APPLICATION

This application is based on a provisional application 60/464,772, filed Apr. 22, 2003, entitled Dual Uni-Axial Thrust With Flow Assist, and assigned to the Assignee of this application and incorporated herein by reference.

FIELD OF THE INVENTION

The invention relates generally to spindle motors, and more particularly to a novel thrust surface for a hydrodynamic fluid bearing for use with disc drive data storage systems.

BACKGROUND OF THE INVENTION

The recent new environments for usage of disc drive memory systems have intensified design and performance needs including miniaturization and reduced power consumption. Besides traditional computing environments, disc drive memory systems are used more recently by devices including digital cameras, digital video recorders, laser printers, photo copiers, jukeboxes, video games and personal music players. Disc drive memory systems store digital information that is recorded on concentric tracks of a magnetic disc medium. Several discs are rotatably mounted on a spindle, and the information, which can be stored in the form of magnetic transitions within the discs, is accessed using read/write heads or transducers. A drive controller is conventionally used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor is known as an in-hub or in-spindle motor, which typically has a spindle mounted by means of a bearing system to a motor shaft disposed in the center of the hub. The bearings permit rotational movement between the shaft and the sleeve, while maintaining alignment of the spindle to the shaft. The read/write heads must be accurately aligned with the storage tracks on the disc to ensure the proper reading and writing of information.

Spindle motors have in the past used conventional ball bearings between the sleeve and the shaft. However, the demand for increased storage capacity and smaller disc drives has led to the design of higher recording area density such that the read/write heads are placed increasingly closer to the disc surface. A slight wobble or run-out in disc rotation can cause the disc to strike the read/write head, possibly damaging the disc drive and resulting in loss of data. Conventional ball bearings exhibit shortcomings in regard to these concerns. Imperfections in the raceways and ball bearing spheres result in vibrations. Also, resistance to mechanical shock and vibration is poor in the case of ball bearings, because of low damping. Vibrations and mechanical shock can result in misalignment between data tracks and the read/write transducer. These shortcomings limit the data track density and overall performance of the disc drive system. Because this rotational accuracy cannot be achieved using ball bearings, disc drives currently utilize a spindle motor having fluid dynamic bearings between a shaft and sleeve to support a hub and the disc for rotation. One alternative bearing design is a hydrodynamic bearing.

In a hydrodynamic bearing, a lubricating fluid such as gas or liquid or air provides a bearing surface between a fixed member and a rotating member of the disc drive. Hydrodynamic bearings eliminate mechanical contact vibration problems experienced by ball bearing systems. Further, hydrodynamic bearings can be scaled to smaller sizes whereas ball bearings have smallness limitations. Dynamic pressure-generating grooves are conventionally formed on a surface of the hydrodynamic bearing journal to generate a localized area of high pressure and provide a transport mechanism for fluid to distribute fluid pressure within the bearing and between the rotating surfaces, enabling the spindle to accurately rotate. These grooves typically include an asymmetric shape to overcome any taper effects formed in a journal bearing and to provide for fluid flow.

Demands of the market and advances in technology have lead to the reduction in the physical size of disc drives. Efforts have been made to design smaller profile disc drives without loss of performance. In reducing size, there is a trend to reduce the axial height of the fluid dynamic bearing motor. One axially reduced sized disc drive currently on the market is the one-inch disc drive used with a CF card type II form factor. However, as motors become shorter in axial height, the spacing between bearing components decreases thereby minimizing the angular or rocking stiffness of the bearings. It has become essential in the industry to design disc drives having even smaller dimensions while maintaining motor stiffness and reduced power consumption. What is needed is a hard disc drive having increased journal bearing stiffness and reduced power consumption for current usage environments.

SUMMARY OF THE INVENTION

A journal having an increased journal bearing axial span is provided for spindle motors. By increasing the axial span between journal bearings, wobble or run-out between relatively rotating components is reduced. Also provided, in an embodiment, is an axially minimized journal length for low profile disc drive memory systems and other spindle motors. In an embodiment, additionally provided is a journal bearing and spindle motor that consumes less power as compared to conventional designs. Further provided, in an embodiment, is an added offset pressure generated throughout the journal bearing to avoid any subambient pressure within the journal. A fluid recirculation path is also provided that purges any air from the journal bearing and other fluid containing areas.

Features of the invention are achieved in part by utilizing a primary (radial) thrust surface to maintain journal fluid flow and to generate an added or increased offset pressure through the journal and the recirculation path. The primary thrust surface pumps fluid toward an end of the journal and through a recirculation path under various journal taper conditions. Thus, journal bearing asymmetry of a conventional design, which typically provides for fluid flow, can be eliminated. As an example, the asymmetric portion of a grooved leg of a journal bearing, as in a conventional design, can be removed. In an embodiment, an increase in axial span between journal bearings is thereby feasible and carried out. In another embodiment, axial length of the journal is reduced.

In an embodiment, two separate thrust surfaces provide an axial force in the same direction, opposing an axial bias force created by interaction of the stator and magnet. A primary thrust surface is formed adjacent to an axially upper end of the journal, and a secondary thrust surface is formed adjacent to an axially lower end of the journal. The primary thrust surface is positioned radially inboard of a fluid recirculation path, between the fluid recirculation path and the journal bearing.

In an embodiment, the present invention employs a similar total thrust area as compared to conventional designs. However, the primary thrust surface of the present invention additionally provides fluid flow, a feature not provided by the secondary thrust surface of conventional designs. Therefore, power consumption is reduced since fluid flow is provided by the primary thrust surface, and, in an embodiment, journal asymmetry is reduced or removed and the axial length of the journal bearing is reduced, a reduced journal bearing consuming less power.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

An apparatus and method is described herein for increasing axial span between journal bearings, and for minimizing axial height for low profile disc drive memory systems and other spindle motors. Axial journal bearing span supports the rotation of the relatively rotatable components (ie., shaft and sleeve) in a disc drive. By increasing axial span, wobble or run-out between relatively rotating components is decreased. This is especially critical for the many recent mobile applications of disc drive memory systems. In an embodiment, the spindle motor of the present invention consumes less power as compared to conventional designs, and air is purged from the journal bearing and other fluid containing areas. It will be apparent that features of the discussion and claims may be utilized with disc drives, spindle motors, various fluid dynamic bearing designs including hydrodynamic and hydrostatic bearings, and other motors employing a stationary and a rotatable component. Further, embodiments of the present invention may be employed with a fixed shaft and a rotating shaft. As used herein, the terms "axially" or "axial direction" refers to a direction along a centerline axis length of the shaft, and "radially" or "radial direction" refers to a direction perpendicular to the centerline length of the shaft.

Figure 1:
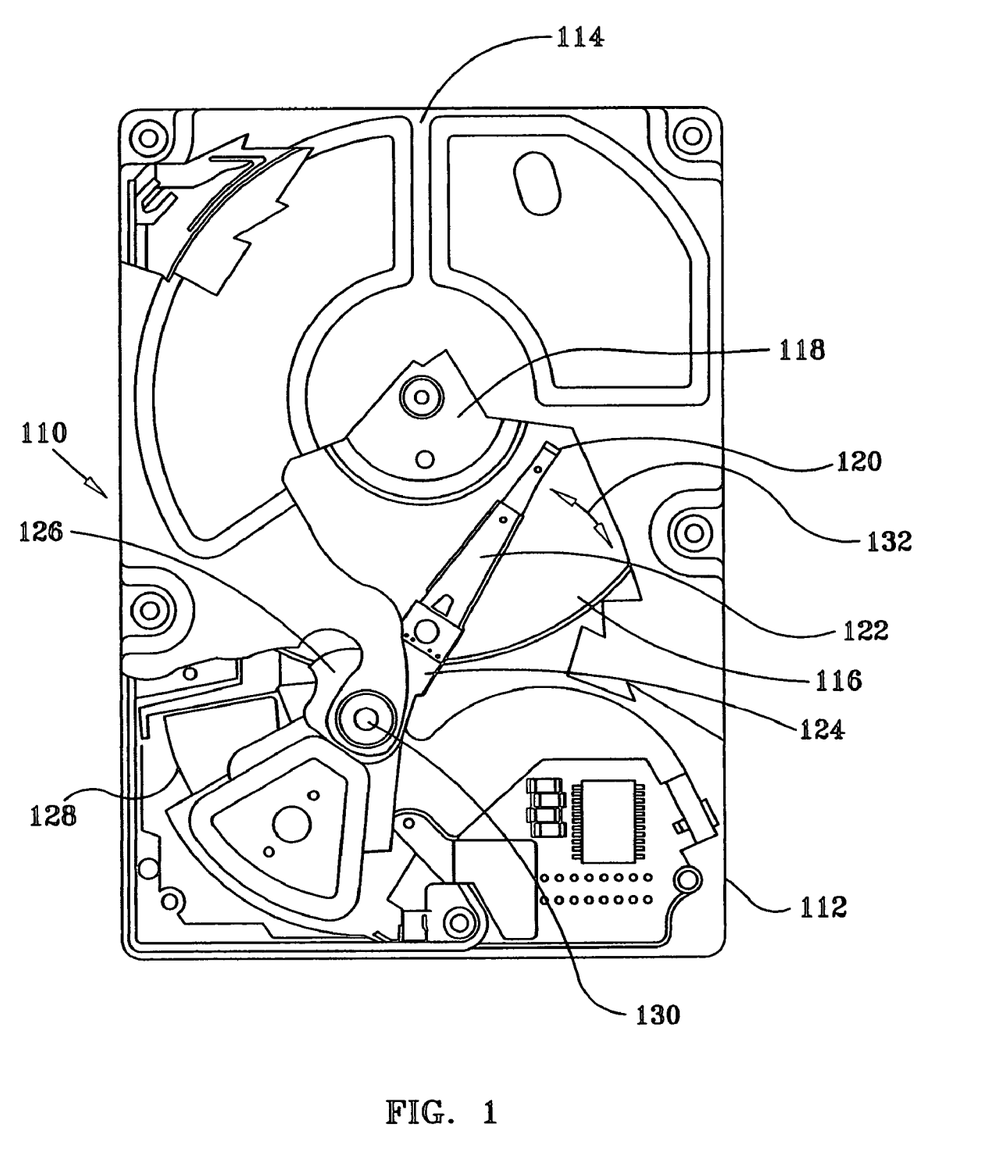
FIG. 1 is a top plain view of a disc drive data storage system in which the present invention is useful, in an embodiment of the present invention.

Referring to the drawings wherein identical reference numerals denote the same elements throughout the various views, FIG. 1 illustrates a typical disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

Figure 2:
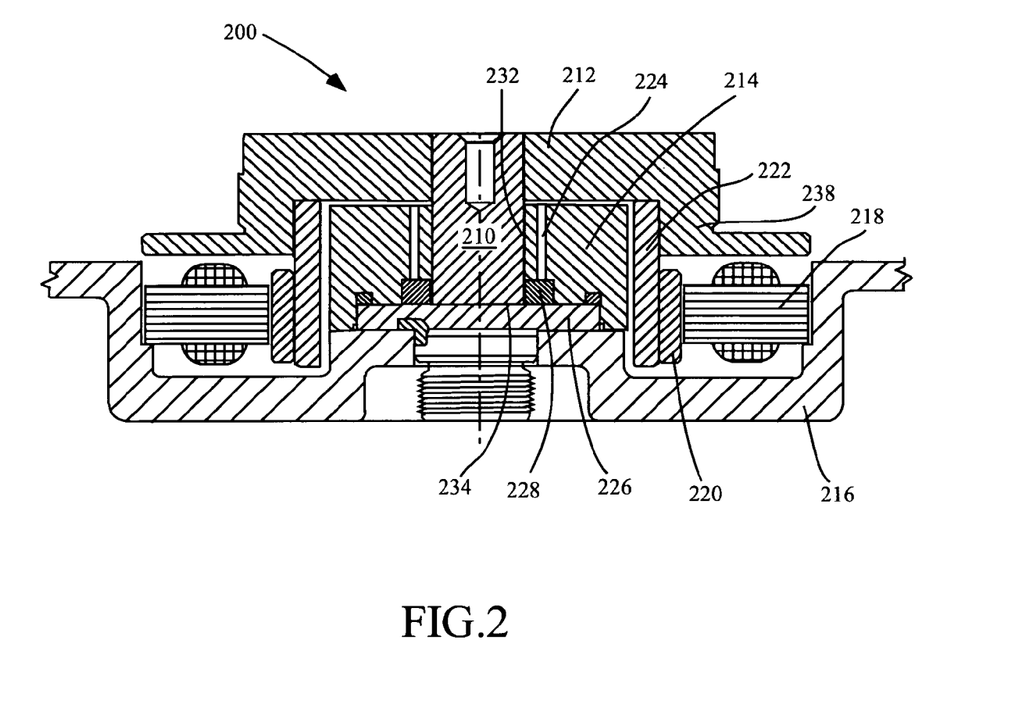
FIG. 2 is a sectional side view of a hydrodynamic bearing spindle motor with a rotating shaft used in a disc drive, in which the present invention is useful.

FIG. 2 is a sectional side view of a hydrodynamic bearing spindle motor 200 used in disc drives 110 in which the present invention is useful. Again, the present invention is not limited to use with a hydrodynamic spindle motor design of a disc drive, which is shown only for purposes of the example. Typically, spindle motor 200 includes a stationary component and a relatively rotatable component. The spindle motor 200 is a rotating shaft motor design. The rotatable components include shaft 210, thrust plate 228, hub 212, backiron 222, and magnets 220. The stationary components include sleeve 214, counterplate 226, base 216 and stator 218. Hub 212 is interconnected with shaft 210 and includes a central core and a disc carrier member 238, which supports disc pack 116 (shown in FIG. 1) for rotation about sleeve 214. Disc pack 116 is held on disc carrier member 238 by disc clamp 118 (also shown in FIG. 1).

The shaft 210 and thrust plate 228 fit and rotate within sleeve 214 having a bore. Thrust plate 228 can be an integral part of shaft 210, or can be a separate piece that is attached to shaft 210, for example, by a press fit. Counterplate 226 is press fitted to or otherwise supported by sleeve 214. Counterplate 226 provides axial stability for hydrodynamic bearings within journal 232, and positions sleeve 214 within spindle motor 200. Together, counterplate 226 and sleeve 214 seal an end of journal 232. Counterplate 226 also cooperates with surfaces of thrust plate 228 and shaft 210 to establish a fluid dynamic thrust bearing 234 that supports shaft 210 for relative rotation with sleeve 214. A fluid, such as lubricating oil or a ferromagnetic fluid fills interfacial regions between shaft 210 and sleeve 214, between thrust plate 228 and sleeve 214, and also between thrust plate 228 and counterplate 226. A fluid recirculation path 224 is formed through sleeve 214 to pass and recirculate fluid through journal 232.

Backiron 222 is mounted to hub 212. One or more magnets 220 are mounted to backiron 222, forming a rotor for spindle motor 200. The magnets 220 interact with a stator 218 attached to the base 216 to cause the hub 212 and shaft 210 to rotate. Magnet 220 can be formed as a unitary, annular ring or can be formed of a plurality of individual magnets that are spaced about the periphery of hub 212. Magnet 220 is magnetized to form one or more magnetic poles.

The outer surface of shaft 210 and the adjacent bore of sleeve 214 together form hydrodynamic journal 232. The radial gap of journal 232 is typically between 0.001 mm. and 0.01 mm. (millimeter), which is a reason why wobble or run-out is a concern. Journal 232 typically includes a grooved surface (forming a journal bearing) provided either on the outer surface of shaft 210 or the inner bore surface of sleeve 214. In order to promote the flow of fluid over bearing surfaces which are defined between the thrust plate 228 and the counterplate 226; between the thrust plate 228 and the sleeve 214; and between the shaft 210 and the sleeve 214, typically one of two opposing surfaces of each such assembly carries sections of pressure generating grooves (not shown), including asymmetric and symmetric grooves. The grooving pattern includes and is not limited to one of a herringbone pattern and a sinusoidal pattern. Asymmetric and symmetric grooves induce fluid flow in the interfacial region and generate a localized region of dynamic high pressure and radial stiffness. As shaft 210 rotates, pressure is built up in each of its grooved regions. In this way, shaft 210 supports hub 212 for constant high speed rotation.

Figure 3A:
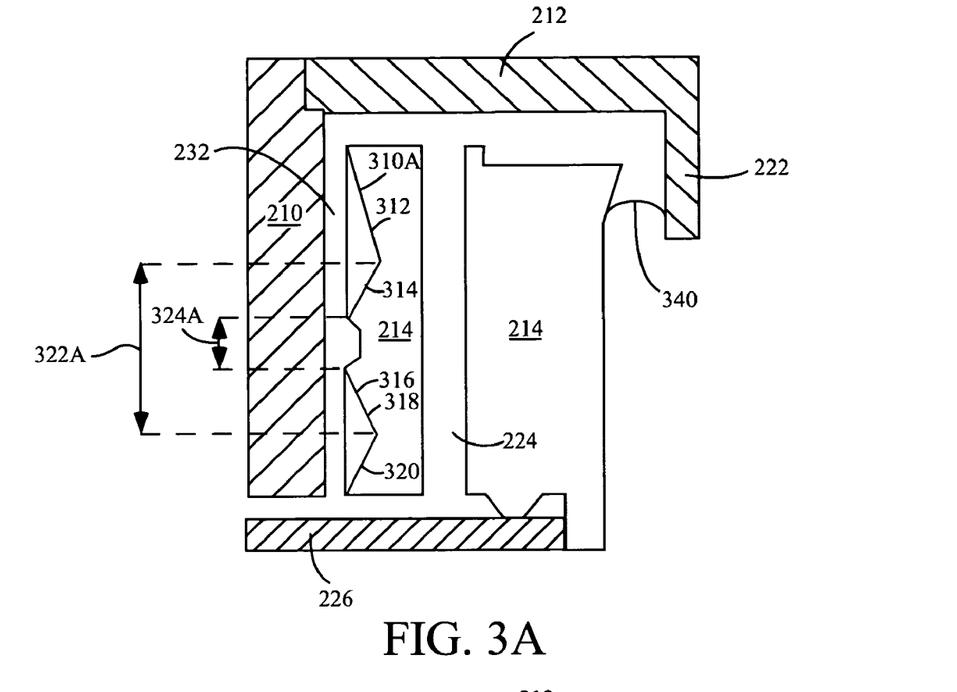
FIG. 3A is another sectional side view of the hydrodynamic bearing spindle motor of FIG. 2, with an enlarged view of the journal illustrating the position of the journal bearings, in an embodiment of the present invention.

Referring to FIG. 3A, another sectional side view of the hydrodynamic bearing spindle motor of FIG. 2 is shown, with an enlarged view of the journal illustrating the position of the journal bearings. An asymmetric groove, being asymmetric, has one leg formed longer than a second leg. An example of an asymmetric form is a herringbone having one leg formed longer than a second leg. The longer asymmetric grooved leg consequently takes up journal axial space limiting the axial distance between journal bearings. Journal 232 includes, in this example, upper bearing 312 and lower bearing 318. The upper bearing 312 includes two legs, namely leg 310A and leg 314. The lower bearing 318 includes leg 316 and leg 320. As shown, leg 310A is an asymmetric leg, being longer than leg 314. The lower bearing 318 does not (as shown) include an asymmetric leg but in alternative designs could include an asymmetric leg. Additionally, journal 232 can alternatively be formed with more than one or two bearings, each bearing having an asymmetric region. Also, the journal bearings are shown formed on the stationary sleeve 214 but could alternatively be formed on shaft 210.

Apex length 322A indicates the axial length between the apex of upper journal bearing 312 and the apex of the lower journal bearing 318. Bearing span 324A indicates the axial length between the upper journal bearing 312 and the lower journal bearing 318. The bearing span 324A is limited in part by the lengths of the bearing legs, since upper bearing 312 is positioned to the upper axially extreme within journal 232 and lower bearing 318 is positioned to the lower axial extreme within journal 232.

Axial Increase in Journal Bearing Span

Figure 3B:
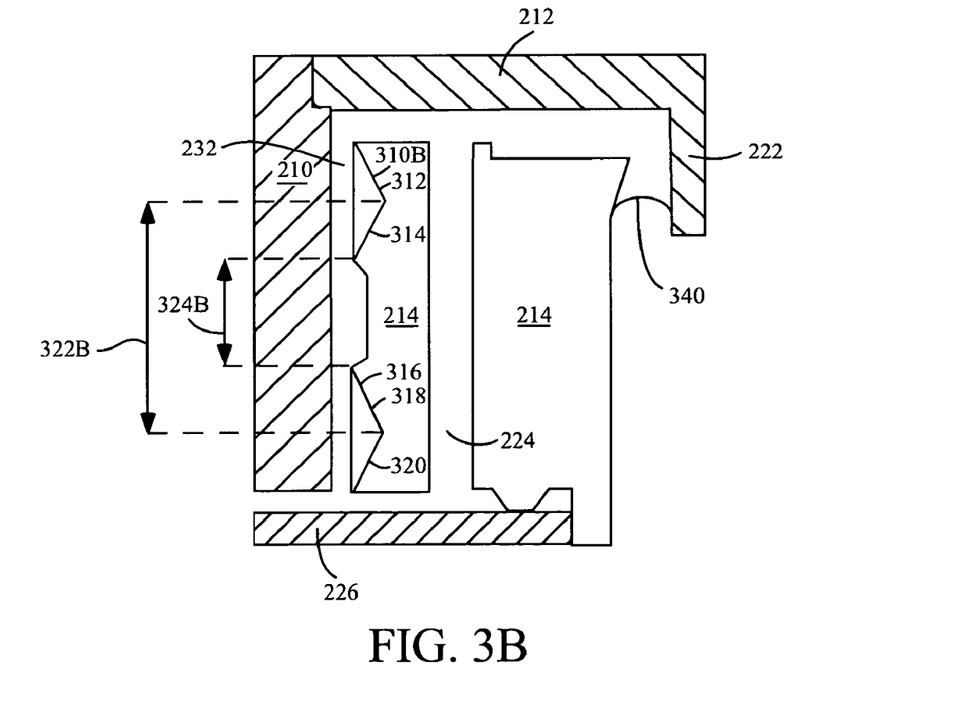
FIG. 3B is a further sectional side view of the hydrodynamic bearing spindle motor of FIG. 2, with an enlarged view of the journal illustrating an increased axial span of the journal bearings, in an embodiment of the present invention.

FIG. 3B shows a further sectional side view of the hydrodynamic bearing spindle motor of FIG. 2, with an enlarged view of the journal illustrating an increased axial span of the journal bearings. Asymmetry is removed from upper bearing 312 by shortening one leg, leg 310B representing the shortened leg. In another embodiment, bearing asymmetry is minimized rather than eliminated. By removing the asymmetry, the upper bearing is reduced in axial length and the axial span between the journal bearings can be increased. In an embodiment, the increase in axial bearing span between journal bearings is based on the length of asymmetry that is eliminated to create the symmetric grooved pattern. In an embodiment, the axial bearing span between journal bearings is increased a length in the range of 10% to 20% as compared to a journal having an asymmetric grooved pattern bearing. In an embodiment, this increase equates to an axial bearing span increase up to 0.7 mm. Further, in an embodiment, the axial length of the journal remains unchanged. In another embodiment, since bearing asymmetry is minimized or eliminated, axial flexibility of bearing span is established and the axial bearing span may be decreased (rather than increased) for considerations including bringing the bearing apex in line with the center of gravity of the spindle motor. As may be observed in comparing FIG. 3A and FIG. 3B, the lengths between the apex of upper bearing 312 and the apex of lower bearing 318 is increased, apex length 322B representing the increased length. Further, the lengths between adjacent legs (legs 314 and 316) of the upper bearing 312 and the lower bearing 318 is increased, bearing span 324B representing the increased length. By increasing the axial span between the journal bearings, journal bearing stiffness is increased and wobble or run-out between the relatively rotating shaft 210 and sleeve 214 is reduced. By increasing the axial span between the journal bearings, an increase in restoring moment is provided on the spindle motor.

Figure 4A:
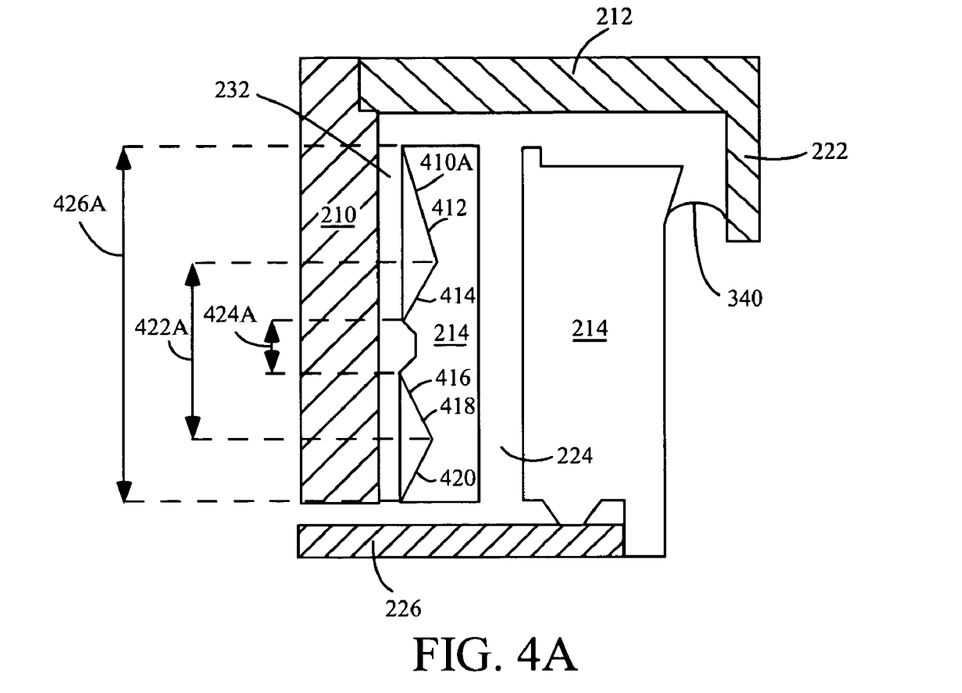
FIG. 4A is another sectional side view of the hydrodynamic bearing spindle motor of FIG. 2, with an enlarged view of the journal illustrating a journal axial length, in an embodiment of the present invention.

FIG. 4A shows a sectional side view of the hydrodynamic bearing spindle motor of FIG. 2, with an enlarged view of the journal illustrating a journal axial length. Journal 232 includes, in this example, upper bearing 412 and lower bearing 418. The upper bearing 412 includes two legs, namely leg 410A and leg 414. The lower bearing 418 includes leg 416 and leg 420. As shown, leg 410A is an asymmetric leg, being longer than leg 414. The longer asymmetric grooved leg 410A consequently takes up journal axial space. The lower bearing 418 does not (as shown) include an asymmetric leg but in alternative designs could include an asymmetric leg. Also, the journal bearings are shown formed on the stationary sleeve 214 but could alternatively be formed on shaft 210.

Apex length 422A indicates the axial length between the apex of upper journal bearing 412 and the apex of the lower journal bearing 418. Bearing span 424A indicates the axial length between the upper journal bearing 412 and the lower journal bearing 418. Journal axial length 426A indicates the length from the axial top of the journal 232 to the axial bottom of the journal 232 as illustrated. The minimum journal axial length 426A is dependant, in part, on the lengths of the bearing legs. Certainly, the bearing span 424A affects journal axial length 426 as well. However, while minimizing bearing span 424A can reduce the journal axial length 426A, journal stiffness decreases and wobble may increase.

Axial Reduction in Journal Length

Figure 4B:
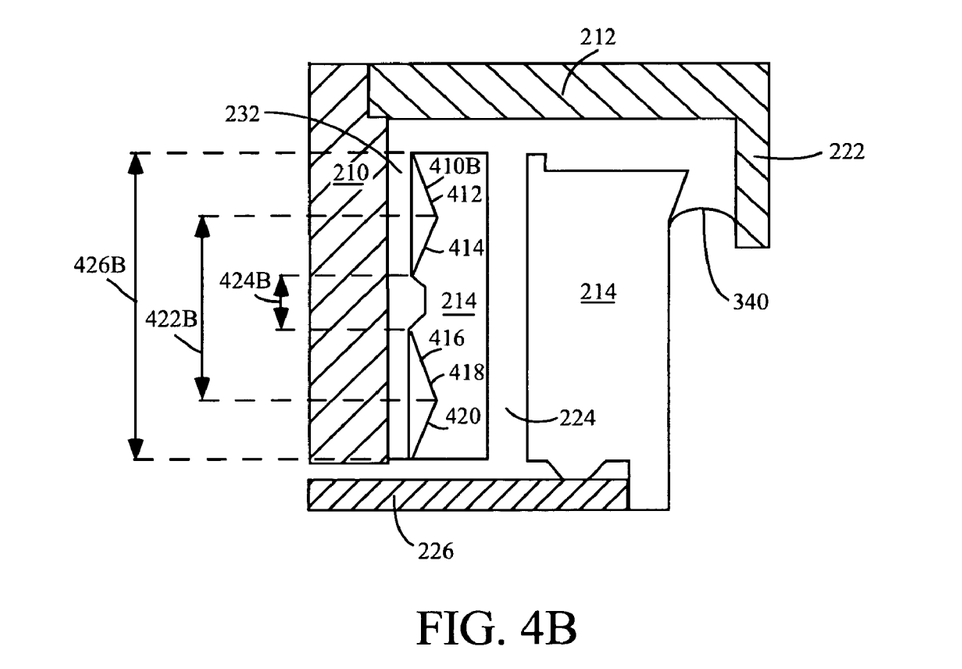
FIG. 4B is another sectional side view of the hydrodynamic bearing spindle motor of FIG. 2, with an enlarged view of the journal illustrating a reduced journal axial length, in an embodiment of the present invention.

Referring to FIG. 4B, another sectional side view of the hydrodynamic bearing spindle motor of FIG. 2 is shown, with an enlarged view of the journal illustrating a reduced journal axial length. Asymmetry is removed from upper bearing 412 by shortening one leg, leg 410B representing the shortened leg. By removing the asymmetry, the upper bearing 412 is reduced in axial length and the journal axial length can be reduced. In an embodiment, the reduction in journal axial length is based on the length of asymmetry that is eliminated to create the symmetric grooved pattern. In an embodiment, the journal axial length is decreased a length in the range of 10% to 20% as compared to a journal having an asymmetric grooved pattern bearing. Further, in an embodiment, the axial bearing span 424B between journal bearings remains unchanged. Additionally, the apex length 422B between the apex of upper journal bearing 412 and the apex of the lower journal bearing 418 remains unchanged. Journal bearing stiffness and wobble or run-out between relatively rotating shaft 210 and sleeve 214 is therefore unaffected. As may be observed in comparing FIG. 4A and FIG. 4B, the journal axial length is decreased (426A versus 426B), journal axial length 426B representing the decreased length. A decrease in journal axial length is needed for low profile disc drive memory systems and other spindle motors.

Fluid Flow

Figure 5:
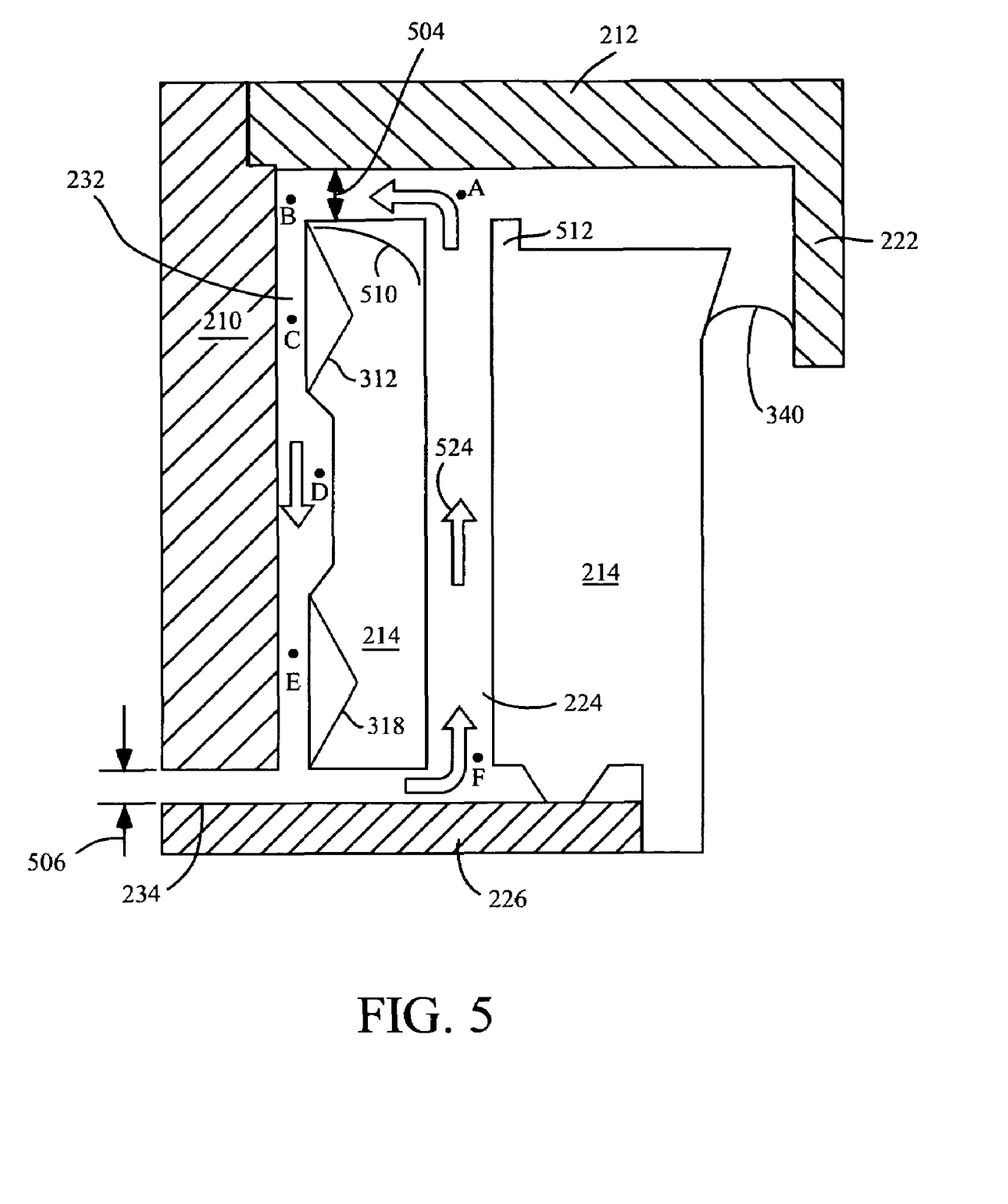
FIG. 5 is another sectional side view of the hydrodynamic bearing spindle motor of FIG. 2, with an enlarged view of the journal showing a primary thrust surface, in an embodiment of the present invention.

FIG. 5 shows another sectional side view of the hydrodynamic bearing spindle motor of FIG. 2, with an enlarged view of the journal showing a primary thrust surface. Conventional spindle motors often employ fluid recirculation through a journal gap separating the shaft from the sleeve. A fluid recirculation path 224 is often formed through sleeve 214 to pass and recirculate fluid through journal 232. Recirculation path 224 may take on one path or more than one path through sleeve 214. By maintaining fluid flow through journal 232 and through fluid recirculation path 224, air is purged from the fluid. In an embodiment, the air is expelled through capillary seal 340. Arrows 524 illustrate the path of fluid flow through journal 232 and fluid recirculation path 224. In conventional designs, asymmetric journal bearings maintain flow through the journal 232 and recirculation path 224. In the present invention, primary thrust surface 510 provides flow. Primary thrust surface 510 is a generally radial grooved or ribbed surface formed between fluid recirculation path 224 and journal 232. The grooves can be formed in the shape of spiral grooves or other shaped grooves. As described herein, with reference to primary thrust surface 510, "inboard" means between fluid recirculation path 224 and journal 232. In an embodiment, primary thrust surface 510 is utilized along with an asymmetric journal bearing to provide fluid flow. In an alternative embodiment, primary thrust surface 510 is utilized in place of an asymmetric journal bearing (wherein the journal bearing asymmetry is minimized or eliminated) to provide fluid flow through the journal and the recirculation path.

That is; journal bearing asymmetry of a conventional design, which typically provides for fluid flow, can be eliminated. As an example, as stated above in the discussion of FIGS. 3A and 3B, the asymmetric portion of a grooved leg of a journal bearing, as in a conventional design, can be removed. In an embodiment, an increase in axial span between journal bearings is thereby feasible and carried out. Bearing 312 and bearing 318 of FIG. 5 represent symmetric bearings positioned with maximized axial bearing separation. In another embodiment, as stated above in the discussion of FIGS. 4A and 4B, axial length of the journal can be reduced.

Power

Reduced power consumption is provided by the present invention. In some conventional designs, secondary thrust surface 234, formed adjacent to gap 506 and formed between counterplate 226 and shaft 210, provides thrust. In the present invention, primary thrust surface 510 (adjacent to primary thrust gap 504) is provided to generate thrust (as well as fluid flow). In an embodiment, the diameter of the secondary thrust surface 234 is minimized since primary thrust surface 510 is utilized. In an embodiment, the present invention employs a similar total thrust area as compared to conventional designs. The primary thrust surface 510 of the present invention additionally provides fluid flow, a feature not provided by the secondary thrust surface 234. Further, in an embodiment, power consumption is further reduced since the axial length of journal bearing 312 (or journal 232) is reduced by reducing or eliminating journal asymmetry, an axially reduced journal consuming less power. In an embodiment, gap 504 is in the range of 0.001 mm. to 0.015 mm., and gap 506 is in the range of 0.001 mm. to 0.015 mm. Gap 504 can optionally include surface 512.

Offset Pressure/Subambient Pressure

Primary thrust surface 510, formed adjacent gap 504, which given a gap size in the range of 0.001 mm. to 0.015 mm., can maintain a relatively forceful fluid flow. In an embodiment, primary thrust surface 510 generates an added or increased offset pressure through journal 232 and recirculation path 224, avoiding any subambient pressure within journal 232 and recirculation path 224. The pressure throughout journal 232 and fluid recirculation path 224 varies with factors including spindle motor design, temperature, gap sizes, and journal bearing design. Pressure typically is lower at the axial ends of the journal and increases at the journal bearings. As an example, in an embodiment, the pressure at point A is 0 pounds per square inch (psi), point B is 50 psi, point C is 200 psi, point D is 45 psi, point E is 150 psi, and point F is 0.05 psi.

Pressure Distribution

Figure 6:
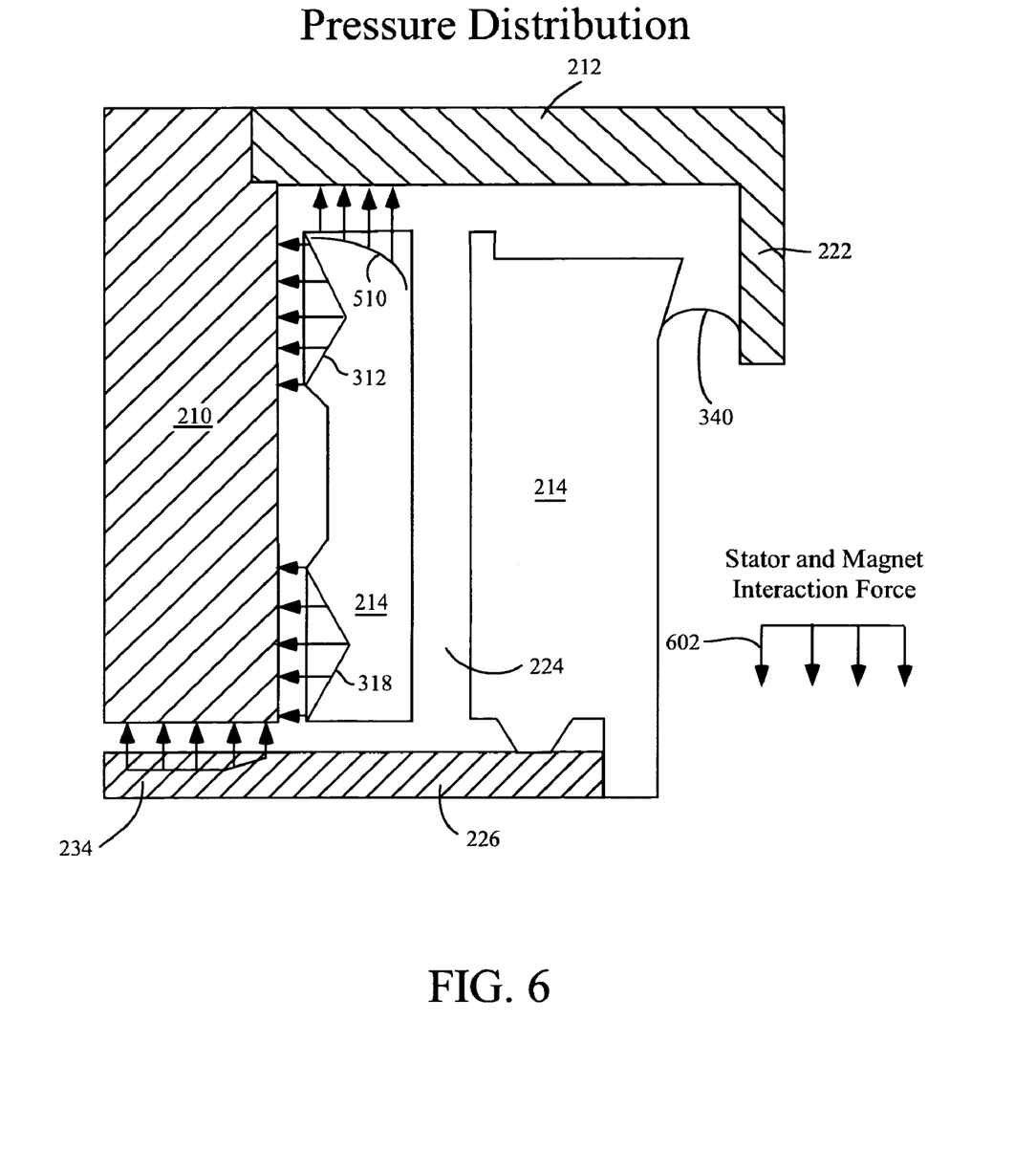
FIG. 6 is another sectional side view of the hydrodynamic bearing spindle motor of FIG. 2, with an enlarged view of the journal illustrating pressure distribution, in an embodiment of the present invention.

FIG. 6 shows another sectional side view of the hydrodynamic bearing spindle motor of FIG. 2, with an enlarged view of the journal illustrating pressure distribution. In a conventional design, counterplate 226 (or thrust plate 228, shown in FIG. 2) includes a series of alternating grooves and lands, forming a bearing, extending along the gap between counterplate 226 and shaft 210. When the bearing surface is rotated secondary thrust surface 234 (the grooves and lands) pump inward to create a pressure increase toward the center of the shaft. This pressure maintains the bearing surfaces apart under external loading. The secondary thrust surface 234 also generates an axial force that opposes an axial force 602 generated by interaction of the stator and the magnet. Further, any air in the bearing is driven in a direction opposite to a pressure increase, air being driven toward recirculation path 224 where it is swept toward capillary seal 340 and released. Another pressure is generated at the journal bearings as previously discussed. As illustrated, pressure is typically increased at journal bearings 312 and 318 with higher pressure at the bearing apex.

Primary thrust surface 510 also generates an axial force that opposes axial force 602 generated by interaction of the stator and the magnet. In an embodiment, primary thrust surface 510 and secondary thrust surface 234 provide an axial force in the same direction, opposing axial bias force 602 created by interaction of the stator and magnet. In an alternative embodiment, primary thrust surface 510 alone provides an axial force that opposes the axial force 602 generated by interaction of the stator and the magnet.

Other features and advantages of this invention will be apparent to a person of skill in the art who studies this disclosure. For example, those skilled in the art will appreciate that features of the present invention can further be utilized with a rotating sleeve hydrodynamic bearing spindle motor. Thus, exemplary embodiments, modifications and variations may be made to the disclosed embodiments while remaining within the spirit and scope of the invention as defined by the appended claims.

We claim:

1. A spindle motor comprising:
a rotatable component defining a journal gap and relatively rotatable with a stationary component;
a recirculation path formed through one of the stationary component and the rotatable component for recirculating fluid through the journal gap;
a first thrust surface extending substantially radially, formed on one of the stationary component and the rotatable component, and formed between the recirculation path and the journal gap, wherein a capillary seal is formed adjacent to the recirculation path; and
a second thrust surface extending substantially radially, formed on one of the rotatable component and the stationary component at an axial end of the rotatable component and substantially situated axially distal from the first thrust surface, wherein the first thrust surface generates a first axial force in the same direction as a second axial force generated by the second thrust surface.

2. The spindle motor as in claim 1, further comprising an asymmetric grooved pattern forming a journal bearing formed on at least one of the adjacent surfaces of the stationary component and the rotatable component, adjacent to the journal gap.

3. The spindle motor as in claim 1, further comprising a grooved pattern consisting of a symmetric grooved pattern forming a journal bearing formed on at least one of the adjacent surfaces of the stationary component and the rotatable component, adjacent to the journal gap.

4. The spindle motor as in claim 3, wherein axial span between a first journal bearing and a second journal bearing is maximized, and wherein axial length of the journal remains unchanged.

5. The spindle motor as in claim 3, wherein axial length of the journal is minimized.

6. The spindle motor as in claim 1, wherein the first thrust surface comprises a grooved surface that generates an offset pressure through the journal gap and the recirculation path to avoid subambient pressure throughout the journal, and wherein the first thrust surface is biased for creating a pressure gradient and substantially circulating the fluid about the journal, and purging air from the fluid.

7. The spindle motor as in claim 1, further comprising a stator, affixed to the stationary component, for interacting with a magnet affixed to the rotatable component and driving the rotatable component, wherein the first axial force and the second axial force are positioned to oppose a third axial force generated by interaction of the stator and the magnet.

8. A spindle motor for incorporation into a disc drive storage system comprising:
a rotatable component defining a journal gap and relatively rotatable with a stationary component;
a data storage disc attached to the rotatable component;
a recirculation path formed through one of the stationary component and the rotatable component for recirculating fluid through the journal gap;
a first thrust surface extending substantially radially, formed on one of the stationary component and the rotatable component, and formed between the recirculation path and the journal gap, wherein a capillary seal is formed adjacent to the recirculation path; and a second thrust surface extending substantially radially, formed on one of the rotatable component and the stationary component at an axial end of the rotatable component and substantially situated axially distal from the first thrust surface, wherein the first thrust surface generates a first axial force in the same direction as a second axial force generated by the second thrust surface.

9. The spindle motor as in claim 8, further comprising a grooved pattern consisting of a symmetric grooved pattern forming a journal bearing formed on at least one of the adjacent surfaces of the stationary component and the rotatable component, adjacent to the journal gap.

10. The spindle motor as in claim 9, wherein axial span between a first journal bearing and a second journal bearing is maximized, and wherein axial length of the journal remains unchanged.

11. The spindle motor as in claim 9, wherein axial length of the journal is minimized.

12. The spindle motor as in claim 8, wherein the first thrust surface comprises a grooved surface that generates an offset pressure through the journal gap and the recirculation path to avoid subambient pressure throughout the journal, and wherein the first thrust surface is biased for creating a pressure gradient and substantially circulating the fluid about the journal, and purging air from the fluid.

13. The spindle motor as in claim 8, further comprising a stator, affixed to the stationary component, for interacting with a magnet affixed to the rotatable component and driving the rotatable component, wherein the first axial force and the second axial force are positioned to oppose a third axial force generated by interaction of the stator and the magnet.

14. A method comprising:
defining a journal gap between a relatively rotatable component and a stationary component;
forming a recirculation path through one of the stationary component and the rotatable component for recirculating fluid through the journal gap;
forming a first thrust surface between the recirculation path and the journal gap, extending substantially radially on one of the stationary component and the rotatable component, wherein a capillary seal is formed adjacent to the recirculation path; and
forming a second thrust surface to extend substantially radially on one of the rotatable component and the stationary component at an axial end of the rotatable component and substantially situated axially distal from the first thrust surface, wherein the first thrust surface generates a first axial force in the same direction as a second axial force generated by the second thrust surface.

15. The method as in claim 14, further comprising forming a journal bearing having an asymmetric grooved pattern on at least one of the adjacent surfaces of the stationary component and the rotatable component, adjacent to the journal gap.

16. The method as in claim 14, further comprising forming a journal bearing having a grooved pattern consisting of a symmetric grooved pattern on at least one of the adjacent surfaces of the stationary component and the rotatable component, adjacent to the journal gap.

17. The method as in claim 16, further comprising maximizing axial span between a first journal bearing and a second journal bearing, wherein axial length of the journal is unchanged.

18. The method as in claim 16, further comprising minimizing axial length of the journal.

19. The method as in claim 14, further comprising generating an offset pressure through the journal gap and the recirculation path to avoid subambient pressure throughout the journal, utilizing a grooved first thrust surface, and biasing the first thrust surface to create a pressure gradient and to substantially circulate the fluid about the journal and purge air from the fluid.

20. The method as in claim 14, further comprising positioning the first axial force and the second axial force to oppose a third axial force generated by interaction of a stator and a magnet, wherein the stator is affixed to the stationary component and the magnet is affixed to the rotatable component for driving the rotatable component.

* * * * *